US 11,573,738 B2

(12) United States Patent
Pang et al.

(10) Patent No.: US 11,573,738 B2
(45) Date of Patent: Feb. 7, 2023

(54) SYNCHRONOUS DESTAGE OF WRITE DATA FROM SHARED GLOBAL MEMORY TO BACK-END STORAGE RESOURCES

(71) Applicant: EMC IP HOLDING COMPANY LLC, Hopkinton, MA (US)

(72) Inventors: Lixin Pang, Needham, MA (US); Rong Yu, West Roxbury, MA (US); Peng Wu, Westborough, MA (US); Shao Hu, Westborough, MA (US); Mohammed Asher Vt, Bangalore (IN)

(73) Assignee: Dell Products, L.P., Hopkinton, MA (US)

( * ) Notice: Subject to any disclaimer, the term of this patent is extended or adjusted under 35 U.S.C. 154(b) by 157 days.

(21) Appl. No.: 17/151,794

(22) Filed: Jan. 19, 2021

(65) Prior Publication Data

US 2022/0229589 A1    Jul. 21, 2022

(51) Int. Cl.
*G06F 3/06*    (2006.01)

(52) U.S. Cl.
CPC .......... *G06F 3/0659* (2013.01); *G06F 3/0619* (2013.01); *G06F 3/0631* (2013.01); *G06F 3/0653* (2013.01); *G06F 3/0689* (2013.01)

(58) Field of Classification Search
CPC .... G06F 3/0659; G06F 3/0619; G06F 3/0631; G06F 3/0653; G06F 3/0689
See application file for complete search history.

(56) References Cited

U.S. PATENT DOCUMENTS

| 10,997,026 | B1* | 5/2021 | Kamran | G06F 11/076 |
| 2005/0228941 | A1* | 10/2005 | Abe | G06F 11/2089 |
| | | | | 711/E12.019 |
| 2012/0011313 | A1* | 1/2012 | Kopylovitz | G06F 3/0653 |
| | | | | 711/E12.019 |
| 2013/0191590 | A1* | 7/2013 | Malwankar | G06F 3/0661 |
| | | | | 711/E12.019 |

* cited by examiner

Primary Examiner — Charles Rones
Assistant Examiner — Han V Doan
(74) Attorney, Agent, or Firm — Anderson Gorecki LLP

(57) ABSTRACT

A synchronous destage process is used to move data from shared global memory to back-end storage resources. The synchronous destage process is implemented using a client-server model between a data service layer (client) and back-end disk array of a storage system (server). The data service layer initiates a synchronous destage operation by requesting that the back-end disk array move data from one or more slots of global memory to back-end storage resources. The back-end disk array services the request and notifies the data service layer of the status of the destage operation, e.g. a destage success or destage failure. If the destage operation is a success, the data service layer updates metadata to identify the location of the data on back-end storage resources. If the destage operation is not successful, the data service layer re-initiates the destage process by issuing a subsequent destage request to the back-end disk array.

15 Claims, 5 Drawing Sheets

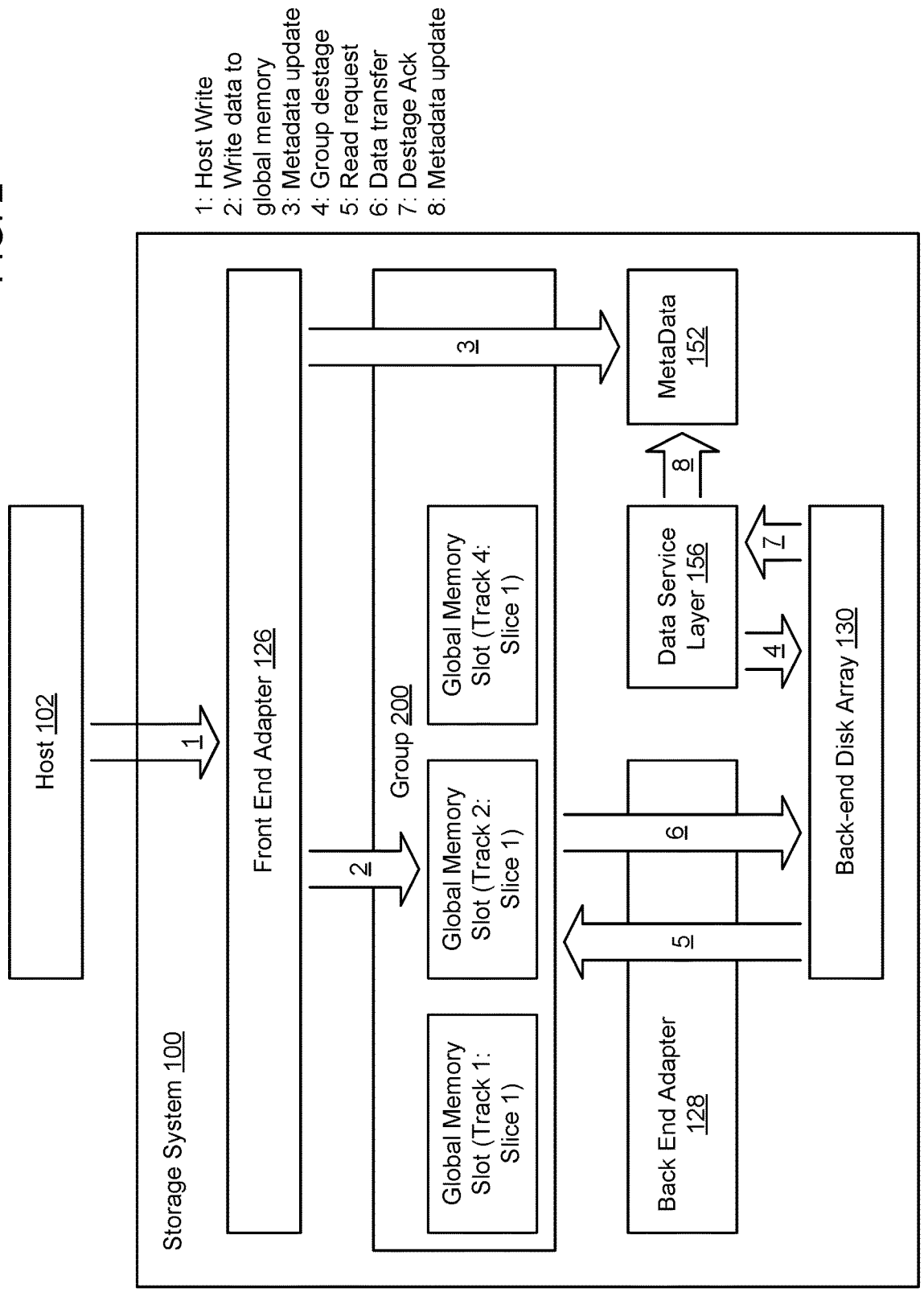

FIG. 3

Metadata 152

| | | | | 425 |
|---|---|---|---|---|
| Global memory slot 1 | Track ID:122 | Back-end Slice ID:45 | Destage Group ID:1 |
| Global memory slot 2 | Track ID:254 | Back-end Slice ID: 32 | Destage Group ID:2 |
| Global memory slot 3 | Track ID:302 | Back-end Slice ID:49 | Destage Group ID:3 |
| Global memory slot 4 | Track ID:544 | Back-end Slice ID: 32 | Destage Group ID:2 |
| Global memory slot 5 | Track ID:123 | Back-end Slice ID:45 | Destage Group ID:1 |
| Global memory slot 6 | Track ID:253 | Back-end Slice ID: 32 | Destage Group ID:2 |
| Global memory slot 7 | Track ID:120 | Back-end Slice ID:45 | Destage Group ID:1 |
| Global memory slot 8 | Track ID:255 | Back-end Slice ID: 32 | Destage Group ID:2 |
| ••• | ••• | ••• | ••• |
| Global memory slot n | Track ID:256 | Back-end Slice ID: 32 | Destage Group ID:2 |

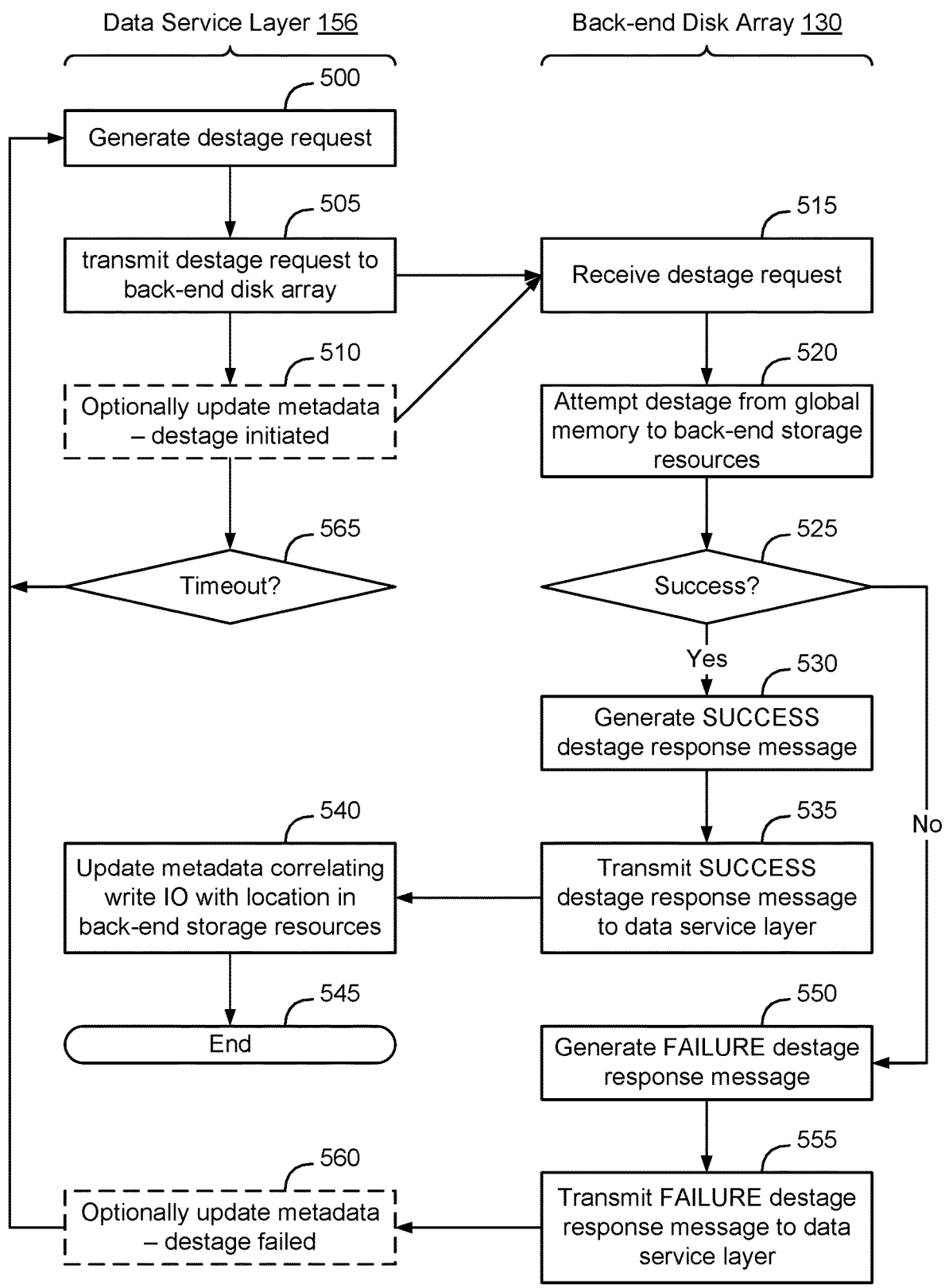

SYNCHRONOUS DESTAGE OF WRITE DATA FROM SHARED GLOBAL MEMORY TO BACK-END STORAGE RESOURCES

FIELD

This disclosure relates to computing systems and related devices and methods, and, more particularly, to a method and apparatus for synchronous destage of write data from shared global memory to back-end storage resources.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter which is set forth by the claims presented below.

All examples and features mentioned below can be combined in any technically possible way.

A synchronous destage process from shared global memory to back-end storage resources is implemented using a client-server model between a data service layer (client) and back-end disk array of a storage system (server). The data service layer initiates a synchronous destage operation by requesting that the back-end disk array move data from one or more slots of global memory to managed drives of the back-end disk array. The back-end disk array services the request, and notifies the data service layer of the status of the destage operation, e.g. a destage success or destage failure, using a destage response message. If the destage operation is a success, the data service layer updates metadata to identify the location of the data on back-end storage resources, clears the write pending status, and releases the slots of global memory. If the destage operation is not successful, the data service layer re-initiates the destage operation by issuing a subsequent destage request for those slots to the back-end disk array.

In some embodiments, the data service layer groups write operations based on their back-end track information, and uses the back-end track information where the data will be stored on the managed drives of the back-end disk array to optimize the timing of sending destage requests to the back-end disk array. In some embodiments, requests are grouped in units of back-end slices, such that multiple host write requests that belong to the same back-end slice are grouped together in the same destage message. When a destage success response message associated with a group of destage operations is received from the back-end disk array, the data service layer updates the write pending status for all of the write pending requests that were part of the group destage.

Implementing destage operations using a synchronous destage process significantly reduces the amount of metadata required to implement destage operations, and significantly reduces the amount of updates to the metadata compared to an asynchronous destage process. Specifically, implementing destage operations using a synchronous destage process enables most of the metadata updates to implemented once, after a success/failure response is received from the back-end disk array. Further, in the event of a failed destage attempt or where the destage is disrupted by a fault, the request can be either aborted or retried with no inconsistent metadata.

BRIEF DESCRIPTION OF THE DRAWINGS

FIG. 2 is a functional block diagram showing a process of implementing a method of synchronous destage of write data from shared global memory to back-end storage resources, according to some embodiments.

FIG. 3 is a functional block diagram of a data structure containing metadata associated with data stored in slots of global memory that is pending destage to back-end storage resources, according to some embodiments.

FIG. 5 is a flow chart of a method of implementing a synchronous destage operation to move write data from shared global memory to backend storage resources of a storage system, according to some embodiments.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
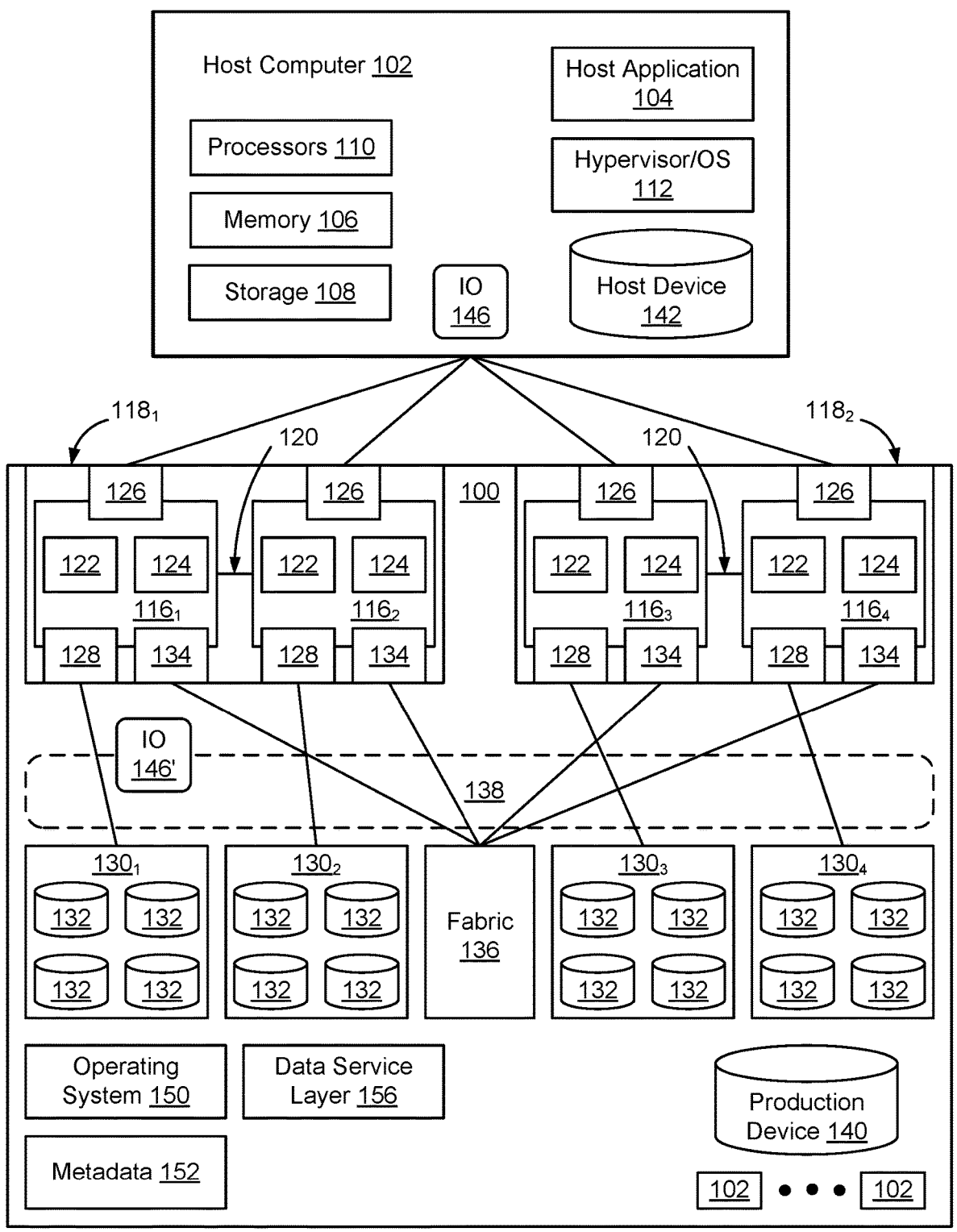
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more front end adapters 126 for communicating with the host computer 102. Each compute node $116_1$-$116_4$ may also include one or more back-end adapters 128 for communicating with respective associated back-end disk arrays $130_1$-$130_4$, thereby enabling access to managed drives 132. A given storage system 100 may include one back-end disk array 130 or multiple back-end disk arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

There may be multiple paths between the host computer 102 and the storage system 100, e.g. one path per front end adapter 126. The paths may be selected based on a wide variety of techniques and algorithms including, for context and without limitation, performance and load balancing. In the case where IO 146 is a read command, the storage system 100 uses metadata to locate the commanded data, e.g. in the virtual shared global memory 138 or on managed drives 132. If the commanded data is not in the virtual shared global memory 138, then the data is temporarily copied into the virtual shared global memory 138 from the managed drives 132 and sent to the host application 104 by the front-end adapter 126 of one of the compute nodes 116₁-116₄.

When a write operation is received by the storage system, the front-end adapter 126 will obtain a slot in global memory 138 and store the data associated with the write operation in the slot. At a later time, the storage system 100 will write the data associated with the write operation from the slot in global memory to back-end storage resources 132. Moving data from a slot in global memory 138 to back-end storage resources 132 is referred to herein as "destaging" the data.

Conventionally, an asynchronous process was used to destage data from global memory to back-end storage resources. While the use of an asynchronous process is beneficial, in that multiple components of the storage system 100 can execute independently of the other components, there are several drawbacks. For example, in some implementations, the asynchronous destage process would pass the data from the front-end adapter to the back-end adapter using a mirrored global memory cache slot. This required extra memory space for the cache slot itself and its associated metadata. Further, allocating two slots in global memory (one to the front-end adapter 126 and one to the back-end adapter 128) reduces the amount of memory resources that can be used by front-end adapter 126. Since the global memory slots used by the front-end adapter 126 are used to implement the storage system cache, reducing the number of global memory slots usable by the front-end adapter impacts read hit performance, since fewer slots of global memory can be used to store data for the cache.

Additionally, resource allocation and deallocation may not be efficient for un-allocated write and relocation, which requires waiting for back-end write pending to be destaged: 'pend complete'. The use of an asynchronous destage process also requires an extra layer of scheduler on the back-end and a significant amount of global memory access.

Finally, implementing write destage operations in an asynchronous manner requires extensive use of metadata to keep track of progress of the write destage, which involves complicated metadata updates, and which makes metadata recovery difficult and non-deterministic in the event of a destage failure. For example, in some storage systems, implementing an asynchronous destage operation involved updating metadata related to the front-end slot holder, back-end slot holder, front-end slot lock, back-end slot lock, front-end slot write pending status, back-end slot write pending status, front-end network interface status, and back-end network interface status. Correctly updating all of the metadata, in sequence, was complicated. If the sequence of updates was disrupted, for example by a fault, recovering inconsistent metadata required the use of a complicated recovery algorithm. This proved to be error-prone and, in certain cases, was nondeterministic and required manual intervention.

According to some embodiments, a more reliable and efficient solution for moving data from shared global memory to back-end storage resources is provided, which provides improved reliability and fault tolerance in a storage system using vault and mirrored data protection. In some embodiments, a synchronous destage process is used to move data from shared global memory to back-end storage resources. The synchronous destage process is implemented using a client-server model between a data service layer of the storage system and back-end disk array of a storage system. The data service layer and back-end disk array are client and server, respectively.

The data service layer initiates destage operations on shared global memory by transmitting a destage request to the back-end disk array to request that the back-end disk array move identified data from slots of global memory to managed drives of the back-end disk array. The back-end disk array services the requests and notifies the data service layer of the status of destage operations of the destage success or failure using destage response messages. If the destage process is a success, the data service layer updates metadata to identify the location of the data on back-end storage resources, clears the write pending status for the front-end slot and metadata, and the slots of global memory are released. If the destage process is not successful, the data service layer re-initiates the destage process by issuing a subsequent destage request to the back-end disk array.

Implementing destage operations using a synchronous destage process significantly reduces the amount of metadata required to implement destage operations, and significantly reduces the amount of updates to the metadata, when compared to the metadata updates that previously were required. Specifically, implementing destage operations in this manner enables most of the metadata updates to be processed once, after a success/failure response is received from the back-end disk array. Further, in the event of a failed destage attempt or where the destage is disrupted by a fault, the destage request can be either aborted or retried with no inconsistent metadata.

In some embodiments, the data service layer groups write operations based on their back-end track information, and uses the back-end track information where the data will be stored on the managed drives of the back-end disk array to optimize the timing of sending destage requests to the back-end disk array. In some embodiments, requests are grouped in units of back-end slices, such that multiple host write requests that belong to the same back-end slice are grouped together in the same destage message.

After completion of the group destage operation, the back-end disk array transmits a write acknowledgment to the data service layer. If the write acknowledgment indicates that the group destage was successful, the data service layer updates the metadata for the group of write operations to indicate the location of the data on managed drives of back-end disk array, clears the write pending status for the front-end slot and metadata, and the slots of global memory are released. If the write pending acknowledgment indicates that the group destage was not successful, the group destage can be resubmitted to the back-end disk array. Since the data service layer does not generate metadata updates to keep track of the destage process while the back-end disk array is attempting to implement the destage operation, failure of the destage operation does not result in a complicated metadata recovery process.

FIG. 2 is a functional block diagram of an example process of implementing local synchronous destage operations between storage resources of global memory 138 and managed drives 132 of back-end disk array 130. In some embodiments, local synchronous destage is implemented using a client-server model between data service layer 156 of the storage system 100 and back-end disk array 130. The data service layer 156 and back-end disk array 130 are client and server, respectively. The data service layer 156 initiates destage requests and send the destage requests to the back-end disk array 130 (arrow 4). The back-end disk array 130 services the destage requests (arrows 5 and 6) and notifies the data service layer 156 the status of completion of the destage operation with destage response messages (arrow 7).

The data service layer 156 is responsible for servicing front-end host write requests to manage writing data from the shared global memory 138 to back-end disk array 130. In some embodiments, the data service layer 156 groups front-end host write requests based on their back-end track information, and prioritizes and optimizes the timing of sending destage requests to the back-end disk array 130. Where the destage requests are group destage requests, in some embodiments the data service layer 156 groups write operations based on the slice of back-end storage resources that will be used to store the write operations, such that all host write requests in the same group destage message belong to the same back-end slice. When a write acknowledgment is received from the back-end disk array 130, the data service layer 156 updates the write pending status for all host write pending requests associated with the group destage operation, according to status from the back-end disk array 130.

FIG. 2 is a functional block diagram showing a process of implementing synchronous group destage operations in a storage system. As shown in FIG. 2, in some embodiments, when a write operation is received at a front-end adapter 126 of the storage system 100 (arrow 1) the front-end adapter obtains one or more slots in global memory 138 and stores the data in global memory (arrow 2). The front-end adapter also updates metadata 152 (arrow 3) to correlate the write IO and slot allocation, and identify those slots of global memory as write pending.

In some embodiments, the size of each slot of global memory 138 is fixed within the storage system 100. Since each write IO will require at least one slot of global memory 138 it may be operationally efficient for a storage system 100 to keep the slots of global memory 138 relatively small, for example to accommodate small write operations. In some embodiments, the storage system 100 may allocate global memory 138 using slots having a slot size of 128 KB, or some other fixed value depending on the implementation. If a write operation is smaller than or equal to the storage system slot size, the write operation will be allocated a single slot in global memory 138 to be used to store the data until the data can be destaged to back-end storage resources of back-end disk array 130. If the write operation is larger than the storage system slot size, multiple slots of global memory 138 will be allocated to the write operation. Alternatively, the host 102 may be constrained to prevent the host 102 from issuing write IO operations on the storage system 100 that would require multiple slots of global memory 138.

Back-end memory resources, in some embodiments, are organized in slices which may be considerably larger than slots of global memory 138. Each slice, as that term is used herein, is a logical organization of a set of physical storage resources. For example, each slice of back-end memory may be supported by a set of tracks on a set of disks implementing a RAID protection group. Depending on the embodiment, it may be more operationally efficient for the back-end storage resources of back-end disk array 130 to be organized using slices that are significantly larger than the slots of global memory 138. For example, a given slice of back-end storage resources may be sized to hold 4, 8 or a larger number of front-end slots of data, even when that data is uncompressed.

In some embodiments, the data service layer 156 uses metadata 152 to create groups 200 of write IOs that should be collectively destaged to back-end storage resources 130. In some embodiments, groups 200 of write IOs are created by the data service layer 156 by determining slots of global memory that contain data that will need to be stored in the same slice of memory in back-end storage resources of back-end disk array 130. By forming a group containing write IOs that collectively will be stored in a given slice of back-end storage resources, it is possible to optimize back-end write operations of back-end disk array 130.

When the data service layer 156 determines that all tracks associated with a given slice or that a set of tracks associated with a given slice are currently destage pending in slots of global memory 138, the data service layer 156 sends a request to the back-end disk array 130 (arrow 4) to request that the back-end disk array 130 destage data contained in the group of slots to back-end storage resources. In some embodiments, the data service layer 156 and back-end disk array 130 operate as client and server respectively.

When the back-end disk array 130 receives the request (arrow 4) to destage the group of write IOs, the back-end disk array 130 requests (arrow 5) that the data contained in each of the slots of global memory containing the group of write IOs be transmitted to the back-end disk array 130. For example, the back-end disk array 130 may issue read operations on the slots to the back-end adapter 128. The particular manner in which data is transmitted by storage system 100 from global memory 138 to the back-end disk array 130 will depend on the implementation. The data is then transmitted to the back-end disk array 130 (arrow 6). Once the write IOs have been written to back-end storage resources of back-end disk array 130, the back-end disk array 130 acknowledges completion of the write operation to data service layer 156 (arrow 7).

After the data service layer 156 receives the write acknowledgment (arrow 7) from the back-end disk array 130, the data service layer 156 updates metadata 152 (arrow 8) to reflect the new location of the data (on back-end storage resources rather than global memory), clears the write-pending indication on the respective slots, and releases the slots of global memory associated with group 200 for use in connection with other IO operations on storage system 100.

Since the global memory slots are not released until after receipt of the write completion acknowledgment from back-end disk array 130 (arrow 7), the write operation from global memory to back-end storage resources is considered synchronous. Specifically, the term "synchronous write" as that term is used herein, refers to a process of moving data from a first location to a second location, in which the data is both written to the second location and acknowledged by the second location, before data at the first location is changed.

Notably, by using a synchronous write process to destage data from slots of global memory 138 to back-end storage resources of back-end disk array 130, it is possible to greatly minimize the amount of metadata updates required to manage the destage process. In particular, as shown in FIG. 2, the metadata 152 is updated when the write IO first is received at the front-end adapter 126 to identify the slot in global memory 138 that was allocated to hold the write IO and identify the slot as write pending, and then the metadata 152 is subsequently updated after a write confirmation has been received from back-end disk array 130 indicating that the write IO data has successfully been destaged to back-end storage resources. Optionally, the data service layer 156 may also keep track of the slots of global memory (slots associated with arrow 6 in FIG. 2) that the data service layer 156 has asked the back-end disk array 130 to destage.

By only updating metadata 152 when write IOs are received and when write IOs are successfully destaged, it becomes much easier to handle faults on the storage system. In particular, since implementing destage operations does not require the complex updating of metadata, it becomes straightforward to handle faults that occur during the destage process.

For example, assume in FIG. 2 that a fault occurs after the data service layer 156 has asked the back-end disk array 130 to destage a group of slots 200 (after arrow 4), and before the back-end disk array 130 completes the destage process (before arrow 6). Since the write IO data is maintained in the same slots of global memory 138 during the destage process, failure of the destage operation will not cause data associated with the group of write IOs to be lost. Further, the data service layer 156 is not involved in the destage process, and does not update any metadata during this destage process, which means that failure of the destage operation will not cause corruption of the metadata 152.

Accordingly, if the back-end disk array 130 transmits a destage failed message as arrow 7, or if the destage process times out, the data service layer 156 can simply issue a new request to the back-end disk array 130 (resend a request represented by arrow 4) to instruct the back-end disk array 130 to attempt to destage the group of slots to back-end storage resources a second time. If the second attempt to destage the slots is successful, the back-end disk array 130 will transmit a destage success message at arrow 7, and the data service layer 156 will complete the destage process by updating metadata 152, clearing the write pending status for the respective slots, and releasing the set of slots of global memory associated with group 200.

FIG. 3 is a functional block diagram of a data structure containing metadata associated data stored in slots of global memory that is pending destage to back-end storage resources. FIG. 3 shows example data structure 300 configured to maintain metadata 152 for use by the data service layer 156. The particular collection of data used by the data service layer 156 to keep track of write IOs stored within global memory 138 and to manage destaging of write IOs from global memory to back-end storage resources will depend on the implementation. Likewise, although the data structure 300 shown in FIG. 3 is implemented in the form of a table, many different types of data structures may be used, and the particular data structure will depend on the particular implementation.

In the example shown in FIG. 3, the metadata 152 includes entries for each global memory slot that currently contains data. As entries are destaged, the slots of global memory are released for reuse in connection with other read and write IOs by hosts on the storage system.

In the example shown in FIG. 3, the metadata contains three entries associated with back-end slice ID: 45 (global memory slots 1, 5, and 7). These three entries are all associated with a particular destage group having Destage Group ID: 1. The metadata also contains five entries associated with back-end slice ID: 32 (global memory slots 2, 4, 6, 8, and n). These five entries are all associated with a particular destage group having Destage Group ID: 2. A third destage group, with destage group ID: 3 is associated with back-end slice ID: 49. In the selection of metadata shown in FIG. 3, a single global memory slot (slot 3) contains data that is waiting to be destaged as destage group ID: 3.

In some embodiments, the data service layer 156 preferentially causes data from the global memory slots to be destaged in groups to back-end memory resources. For example, if the data service layer 156 determines that the destage group contains data for some or all tracks of a given slice of back-end memory, the data service layer 156 can issue a request (arrow 4) to cause the group of slots to be destaged to the slice of back-end storage resources. By collectively writing a group of write IOs to a given slice of back-end storage resources, it is possible to optimize write operations on back-end disk array 130.

Likewise, if there are no groups of write IOs that are to be written to the same back-end slice of storage resources, or if the data service layer 156 determines that one or more of the destage groups has data that has resided in global memory for longer than a threshold amount of time, the data service layer 156 can issue a request (arrow 4) to cause the write IOs to be destaged to back-end storage resources. A destage group may be destaged based on the timeout threshold even if the destage group contains only one global memory slot, such as destage group with ID: 3 in the example shown FIG. 3. By destaging groups upon expiration of a timeout threshold, the data service layer 156 can prevent data from remaining in global memory 138 for an indefinite period of time.

Figure 4:
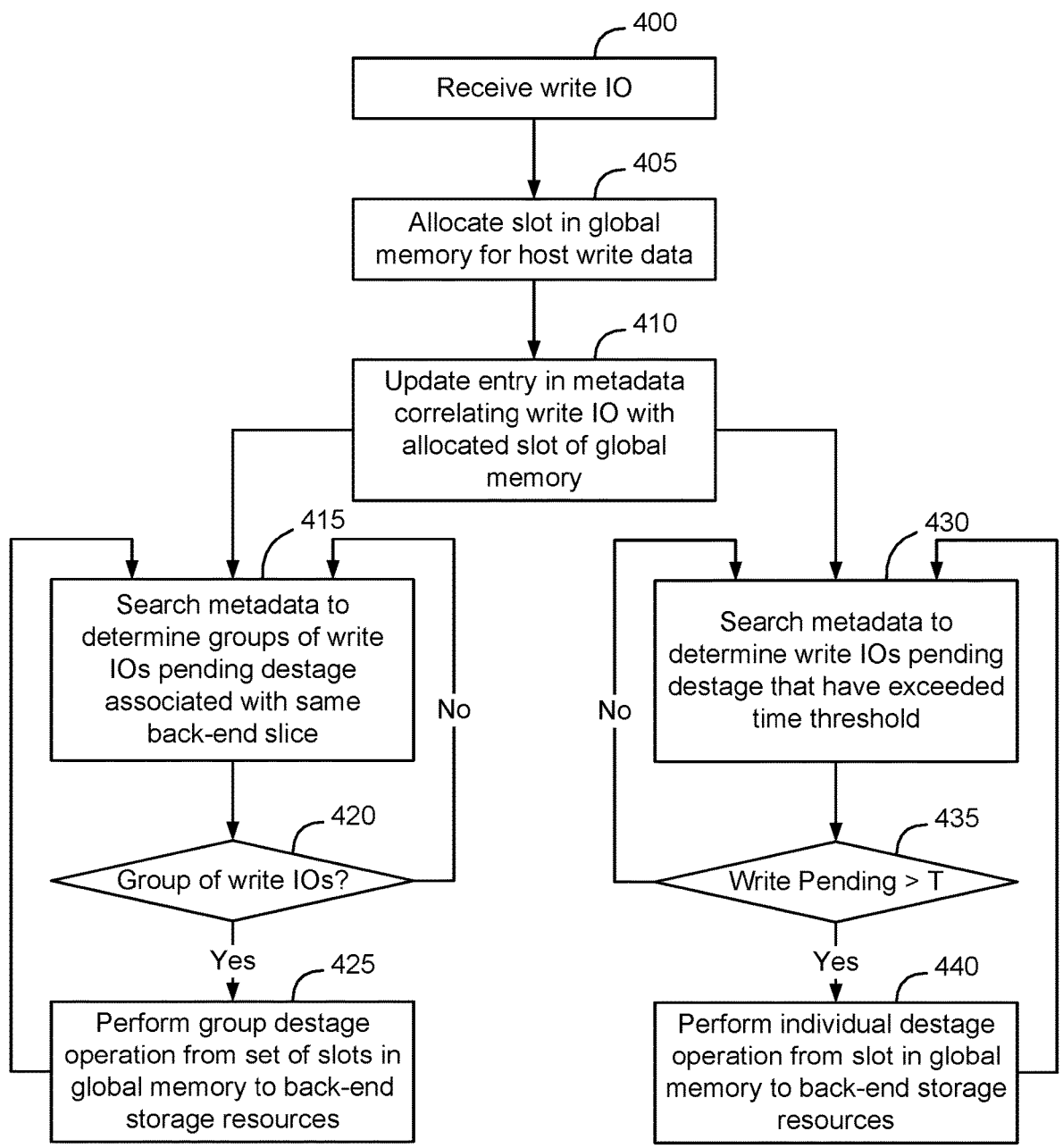
FIG. 4 is a flow chart of an example method of synchronous destage of write data from shared global memory to back-end storage resources, according to some embodiments.

FIG. 4 is a flow chart of an example process of implementing a synchronous group destage operation by the data service layer 156 of storage system 100, according to some embodiments. As shown in FIG. 4, when a write IO is received by the storage system (block 400), a slot in global memory 138 is allocated to be used to store the data associated with the write IO pending destage of the data to back-end storage resources of back-end disk array 130 (block 405). In connection with allocating the slot in global memory, the metadata 152 is updated to correlate the write IO with the allocated slot of global memory 138 (block 410). The metadata 152 also identifies the slot as write pending, and contains information identifying the location (e.g. slice) where the write IO will be stored in back-end storage resources of back-end disk array 130.

Periodically, the data service layer 156 will search through the metadata 152 to determine groups of write IOs pending destage to back-end storage resources that are associated with the same back-end storage slice (block 415). If there are no groups of write IOs (a determination of NO at block 420) the data service layer 156 returns to periodically search through the metadata 152 looking for sets of slots of global memory 138 that can be destaged in groups.

If a group 200 of write IOs is determined that are destined to the same slice of back-end managed resources (a determination of YES at block 420), the data service layer 156 will perform a synchronous group destage operation from a set of slots in global memory 138 to the back-end storage resources (block 425). An example process of implementing the synchronous destage operation is shown in FIG. 2 and is described below in connection with FIG. 5. In some embodiments, as shown in FIG. 2, the data service layer 156 implements the group destage operation by sending an instruction to the back-end disk array 130 (arrow 4) to cause the back-end disk array 130 to retrieve the write IOs from the set of slots of global memory associated with the destage group.

Additionally, as shown in FIG. 4, in some embodiments the data service layer 156 also searches through the metadata 152 to determine write IOs pending destage that have exceeded one or more time thresholds (block 430). If there are no write IOs pending destage that have exceeded a given threshold (a determination of NO at block 435) the process returns to iteratively look for slots of global memory that have exceeded particular time thresholds.

If one or more write IOs pending destage is determined to have exceeded a given time threshold (a determination of YES at block 435) the data service layer 156 will issue a request (arrow 4) to instruct the back-end disk array 130 to initiate a destage operation on the group containing the respective slot that has exceeded the destage time threshold (block 440), even if the group contains only the one respective slot. As noted above, the use of time thresholds can be used to initiate destage of a single write IO, or a group of write IOs containing fewer than all of the tracks of a given slice of back-end storage resources. This prevents write IOs from remaining pending destage in global memory for an excessive period of time, to thereby free up the slots of global memory for reuse in connection with other operations.

FIG. 5 is a flow chart of a method of implementing a synchronous destage operation to move write data from shared global memory to backend storage resources of a storage system, according to some embodiments. In FIG. 5, actions taken by the data service layer 156 are shown on the left-hand side and actions taken by the back-end disk array 130 are shown on the right-hand side. As shown in FIG. 5, a synchronous destage operation starts when the data service layer 156 generates a destage request (block 500) and transmits the destage request to the back-end disk array (block 505). Optionally, the data service layer 156 may update metadata to indicate that the destage has been initiated (block 510).

When the back-end disk array receives the destage request (block 515) the back-end disk array 130 will attempt to implement the destage operation from global memory to back-end storage resources (block 520). In some embodiments this is implemented by the back-end disk array 130 issuing a read operation on the identified slots of global memory 138 on back-end adapter 128. The back-end disk array then determines if the destage operation was successful (block 525). If the destage operation was successful (a determination of YES at block 525) the back-end disk array 130 generates a SUCCESS destage response message (block 530) and transmits the SUCCESS destage response message to the data service layer 156 (block 535).

Upon receipt of the SUCCESS destage response message, the data service layer 156 updates metadata 152 correlating the write IO with the location where the write IO is located in back-end storage resources (block 540). The destage process then ends (block 545), clears the write pending status for the respective slots, and releases the respective slots of global memory.

If the destage operation was not successful (a determination of NO at block 525) the back-end disk array 130 generates a FAILURE destage response message (block 550) and transmits the FAILURE destage response message to the data service layer 156 (block 555).

In some embodiments, when the data service layer 156 receives a FAILURE destage response message, the data service layer 156 is able to generate a new destage request for the write IOs (block 505) and resubmit the new destage request (block 505) to the back-end disk array. The process described in connection with FIG. 5 can thus iterate until the destage operation is a success. Optionally, where the data service layer 156 uses the metadata 152 to keep track of which slots of global memory are pending destage (block 510) the data service layer 156 can also optionally update the metadata to indicate that the destage failed (block 560). Blocks 510 and 560 are shown using dashed lines to indicate that these steps are optional. If the data services layer does not receive any response within a given timeout threshold (block 565), the data service layer may determine that the destage operation was unsuccessful and re-submit the destage request (block 500).

The methods described herein may be implemented as software configured to be executed in control logic such as contained in a Central Processing Unit (CPU) or Graphics Processing Unit (GPU) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible computer readable medium such as random-access memory, a computer memory, a disk, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for implementing synchronous destage of write data from shared global memory to back-end storage resources, the computer program including a set of instructions which, when executed by a computer, cause the computer to perform a method comprising the steps of:

storing write data from multiple write operations in slots of the shared global memory;

updating metadata associated with the write operations in connection with storing the write data in shared global memory;

forming groups of subsets of the slots of shared global memory, each group being associated with a respective subset of write operations, the subset of write operations being selected based on back-end track information where the write data will be stored on managed drives of a back-end disk array;

transmitting a destage request, by a data service layer to the back-end disk array managing the back-end storage resources, the destage request identifying a subset of the slots of the shared global memory;

implementing a destage operation, by the back-end disk array, to move data contained in the subset of the slots of shared global memory to the back-end storage resources;

transmitting a destage response message by the back-end disk array to the data service layer;

in response to a determination that the destage response message indicates that the destage operation was a success, updating the metadata associated with a subset of the write operations associated with the subset of the slots; and in response to a determination that the destage response message indicates that the destage operation was not a success, the method further comprises re-transmitting the destage request, by the data service layer to the back-end disk array, the retransmitted destage request identifying the subset of the slots of the shared global memory.

2. The non-transitory tangible computer readable storage medium of claim 1, wherein the destage request is a group destage request identifying multiple slots of the shared global memory that are to be destaged to a single slice of back-end storage resources.

3. The non-transitory tangible computer readable storage medium of claim 1, further comprising, in response to a determination that the destage response message indicates that the destage operation was a success, clearing a write pending status for the subset of slots and releasing the subset of slots of global memory.

4. The non-transitory tangible computer readable storage medium of claim 3, wherein the synchronous destage causes the data to be moved from the subset of slots of global memory to the back-end storage resources of the back-end disk array, and acknowledged by the back-end disk array to the data services layer, prior to releasing the subset of slots of global memory.

5. The non-transitory tangible computer readable storage medium of claim 1, wherein the data service layer and back-end disk array are implemented using a client-server model, where the data service layer is implemented as a client and the back-end disk array is implemented as a server.

6. The non-transitory tangible computer readable storage medium of claim 1, wherein in response to a determination that the destage response message indicates that the destage operation was not a success, the metadata associated with a subset of the write operations associated with the subset of the slots is not updated.

7. The non-transitory tangible computer readable storage medium of claim 1, wherein the step of implementing the destage operation, by the back-end disk array, comprises issuing read operations by the back-end disk array on the subset of slots of global memory.

8. A storage system, comprising:

a shared global memory;

a front-end adapter containing control logic configured to receive write operations from hosts, store write data from the write operations in slots of the shared global memory, and update metadata associated with the write operations in connection with storing the write data in shared global memory;

a data services layer; and a back-end disk array managing back-end storage resources;

the data services layer containing control logic configured to form groups of subsets of the slots of shared global memory, each group being associated with a subset of write operations containing write data to be stored in a given slice of back-end storage resources on the back-end disk array, and to transmit a destage request to the back-end disk array, the destage request identifying a subset of the slots of the shared global memory; and the back-end disk array containing control logic configured to:

implement a destage operation to move data contained in the subset of the slots of shared global memory to the back-end storage resources;

in response to a determination that the destage operation is successful, transmit a destage response message to the data service layer; and in response to a determination that the destage operation was not successful, transmit a destage failed message to the data service layer;

wherein the control logic of the data service layer is further configured, in response to receipt of a destage failed message, to re-transmit the destage request, by the data service layer to the back-end disk array, the retransmitted destage request identifying the subset of the slots of the shared global memory.

9. The storage system of claim 8, wherein the control logic of the data service layer is further configured to update the metadata associated with a subset of the write operations associated with the subset of the slots in response to a determination that the destage response message indicates that the destage operation was a success.

10. The storage system of claim 8, wherein the destage request is a group destage request identifying multiple slots of the shared global memory that are to be destaged to a single slice of back-end storage resources.

11. The storage system of claim 8, wherein the control logic of the data service layer is further configured to clear a write pending status for the subset of slots and release the subset of slots of global memory in response to a determination that the destage response message indicates that the destage operation was a success.

12. The storage system of claim 11, wherein the control logic of the data service layer and the control logic of the back-end disk array are configured to implement a synchronous destage process, in which data is moved from the subset of slots of global memory to the back-end storage resources of back-end disk array, and acknowledged by the back-end disk array to the data services layer, before the data service layer releases the subset of slots of global memory.

13. The storage system of claim 8, wherein the control logic of the data service layer and the control logic of the back-end disk array are implemented using a client-server model, where the data service layer is implemented as a client and the back-end disk array is implemented as a server.

14. The storage system of claim 8, wherein the control logic of the data service layer is further configured to not update metadata associated with a subset of the write operations associated with the subset of the slots, in response to receipt of the destage failed message.

15. The storage system of claim 8, wherein the control logic of the back-end disk array is configured to implement destage operations by issuing read operations on the slots of global memory.

\* \* \* \* \*